(12) United States Patent
Musumeci

(10) Patent No.: US 6,988,156 B2
(45) Date of Patent: *Jan. 17, 2006

(54) SYSTEM AND METHOD FOR DYNAMICALLY TUNING INTERRUPT COALESCING PARAMETERS

(75) Inventor: Gian-Paolo D. Musumeci, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 379 days.

This patent is subject to a terminal disclaimer.

(21) Appl. No.: 10/268,372

(22) Filed: Oct. 10, 2002

(65) Prior Publication Data
US 2003/0200369 A1    Oct. 23, 2003

Related U.S. Application Data

(63) Continuation-in-part of application No. 10/125,196, filed on Apr. 18, 2002.

(51) Int. Cl.
G06F 13/24    (2006.01)
(52) U.S. Cl. .................. 710/260; 710/104; 710/125; 710/118; 710/262
(58) Field of Classification Search ............ 710/104, 710/260, 125, 118, 262
See application file for complete search history.

(56) References Cited

U.S. PATENT DOCUMENTS 5,613,129 A * 3/1997 Walsh ..................... 710/267
5,613,296 A * 3/1997 Kurino et al. ............. 29/852
5,881,296 A * 3/1999 Williams et al. .......... 710/263
6,065,089 A * 5/2000 Hickerson et al. ........ 710/266
6,189,066 B1 * 2/2001 Lowe et al. .............. 710/260
6,189,067 B1 * 2/2001 Lowe et al. .............. 710/260
6,192,440 B1 * 2/2001 Lowe et al. .............. 710/260
6,195,725 B1 * 2/2001 Luhmann ................. 710/266
6,243,785 B1 * 6/2001 Lowe et al. .............. 710/260
6,266,732 B1 * 7/2001 Chen et al. .............. 710/263
6,351,785 B1 * 2/2002 Chen et al. .............. 710/263
6,397,283 B1 * 5/2002 Ting ....................... 710/260
6,430,628 B1 * 8/2002 Connor ....................... 710/5

(Continued)

OTHER PUBLICATIONS

Bilas, Angelos, et al., "The Effects of Communication Parameters on End Performance of Shared Virtual Memory Clusters," 1997, ACM Press, Proceedings of the 1997 ACM/IEEE Conference on Supercomputing, p. 1-35.*

(Continued)

Primary Examiner—Glenn A. Auve
Assistant Examiner—Donna K. Mason
(74) Attorney, Agent, or Firm—Park, Vaughan & Fleming LLP

(57) ABSTRACT

A system and method for dynamically tuning the interrupt coalescing behavior of a communication interface. An interrupt handler adjusts dynamic Packet and/or Latency values to control how many packets the interface may accumulate, or how much time the interface may wait after receiving a first packet, before it can signal a corresponding interrupt to a host processor and forward the accumulated packet(s). The interrupt handler maintains a Trend parameter reflecting a comparison between recent sets of packets received from the interface and the Packet parameter. The Packet value is decreased or increased as packet traffic ebbs or flows. When the Packet value is incremented from a minimum value, a Fallback mechanism may be activated to ensure a relatively rapid return to the minimum value if an insufficient amount of traffic is received to warrant a non-minimum Packet value. The Latency value may be increased as the processor's workload increases.

40 Claims, 7 Drawing Sheets

U.S. PATENT DOCUMENTS

| | | | |
|---|---|---|---|
| 6,529,986 B1 * | 3/2003 | Chen et al. | 710/263 |
| 6,574,694 B1 * | 6/2003 | Chen et al. | 710/263 |
| 6,615,305 B1 * | 9/2003 | Olesen et al. | 710/262 |
| 6,681,275 B2 * | 1/2004 | Connor et al. | 710/58 |
| 6,754,738 B2 * | 6/2004 | Brice et al. | 710/48 |
| 6,760,799 B1 * | 7/2004 | Dunlap et al. | 710/260 |
| 6,779,054 B2 * | 8/2004 | Campbell et al. | 710/48 |
| 6,868,466 B2 * | 3/2005 | Connor | 710/260 |
| 2003/0056041 A1 * | 3/2003 | Connor et al. | 710/58 |
| 2003/0065853 A1 * | 4/2003 | Lary et al. | 710/260 |
| 2003/0079067 A1 * | 4/2003 | Schmidt | 710/48 |
| 2003/0084213 A1 * | 5/2003 | Brice et al. | 710/48 |
| 2003/0200369 A1 * | 10/2003 | Musumeci | 710/260 |

OTHER PUBLICATIONS

The American Heritage College Dictionary, 2002, Houghton Mifflin Company, 4th Edition, p. 1033 and 1117-1118.*

"Workload: A Whatis.com Definition," SearchCIO.com, last updated Jul. 19, 2004 (2 pages).*

* cited by examiner

SYSTEM AND METHOD FOR DYNAMICALLY TUNING INTERRUPT COALESCING PARAMETERS

RELATED APPLICATION

This application is a continuation-in-part of U.S. application Ser. No. 10/125,196, filed Apr. 18, 2002, which is hereby incorporated by reference.

BACKGROUND

This invention relates to the field of computer systems. More particularly, a system and methods are provided for dynamically adjusting parameters of a communication interface, in response to a dynamic measurement of the interface workload, to modify the manner in which the communication interface coalesces interrupts associated with the forwarding of communications to a host processor.

When a communication interface (e.g., a network interface circuit, or NIC) receives a packet, frame or other communication from a communication link, it is usually configured to notify a host processor via an interrupt. In early network interfaces, a separate interrupt may have been issued for each packet the interface received from the network and forwarded to the host. As long as data rates were low, packets would arrive relatively infrequently, and a host processor would not be overwhelmed.

However, at today's data rates (e.g., 1 gigabit per second and higher), if a separate interrupt were issued by a network interface for every packet it received and passed to a host processor, it would signal more than 80,000 interrupts per second. Even a modern, high-performance, processor, if besieged with so many interrupts, would likely be incapable of processing them and switching in and out of an interrupt-processing mode, while still handling normal processing tasks.

One method of decreasing the number of interrupts issued by a communication interface to a host processor is called interrupt blanking or interrupt coalescing. With interrupt blanking, a communication interface may accumulate multiple packets before issuing an interrupt to a host processor. Illustratively, when the communication interface receives a first packet, it initiates a packet counter and a latency timer. When either a predetermined number of packets is accumulated or a predetermined period of time elapses, all of the accumulated packets are sent to the host and one interrupt is signaled.

Interrupt blanking or coalescing has typically been implemented solely within the communication interface hardware. The parameters that determine when an interrupt may be issued (i.e., maximum packet count, maximum latency) were static parameters programmed into the communication interface before or during its initialization. The parameters could not be changed without resetting the interface and disrupting the communication flow through the interface.

Thus, the parameters for controlling interrupt blanking must be configured before the pattern of traffic to be handled is known. At one extreme, the traffic may be relatively heavy; at the other, the traffic may be relatively light. A heavy traffic pattern is typical of the transfer of a large amount of data, and involves the receipt of many separate packets relatively close in time. A light traffic pattern, involving the receipt of relatively few packets, spread out over time, may be indicative of a request-response communication flow between a client and a server, or other entities.

If a communication interface was optimized for one type of traffic, it would necessarily handle the other type inefficiently. Thus, configuring the interrupt blanking parameters for a high packet count and high latency would allow for efficient handling of a large amount of data, but would provide poor performance for a request-response flow. A low packet count and low latency would entail the opposite. Thus, the parameters have typically been optimized for either heavy or light traffic, thereby handling the other type very ineffectively, or have been set to median values, in which case both types are handled equally inefficiently.

Because interrupt blanking parameters have been static, as the traffic received by a communication interface varied from what it was optimized for, performance would vary commensurately. The parameters could not be dynamically configured to meet the changing traffic pattern.

SUMMARY

Therefore, in one embodiment of the invention, a system and methods are provided for dynamically modifying the interrupt blanking (or coalescing) behavior of a communication interface, in response to the changing workload or traffic pattern received at the interface.

In an embodiment of the invention, an interrupt handler or device driver dynamically adjusts IMFC (Instantaneous Maximum Frame Count) and/or IML (Instantaneous Maximum latency) values on the communication interface. IMFC and IML control, respectively, how many frames the interface may accumulate, or how much time the interface may wait after receiving a first frame, before signaling a corresponding interrupt and forwarding the accumulated packet(s). The interrupt handler maintains a Trend parameter reflecting a comparison between recent sets of frames received from the interface and the interface's IMFC parameter at the time of the interrupts. The IMFC value is decreased or increased as a flow of frames ebbs or flows.

In one embodiment of the invention, when IMFC is incremented from a minimum value, a fallback mechanism is activated to ensure a relatively rapid return to the minimum value if an insufficient amount of traffic is received to warrant the higher IMFC value. While the fallback mechanism is active, IML may be set at lower than normal values. When the fallback mechanism expires, IML may be reset to a default or normal value.

During each interrupt serviced by the interrupt handler, one or both IMFC and IML may be written to the communication interface to overwrite previous values and control the interrupt coalescing behavior of the interface.

In another embodiment of the invention, the status (e.g., workload) of a processor that executes the interrupt handler or device driver may be considered when adjusting an interrupt coalescing parameter. In this embodiment, the percentage of time that the processor is idle or waiting for a task is compared to one or more thresholds. In one implementation, as the proportion of time that the processor is idle decreases below a first threshold (e.g., 50%), IML (and/or IMFC) may be increased to increase the time between successive interrupts.

DETAILED DESCRIPTION

Figure 1:
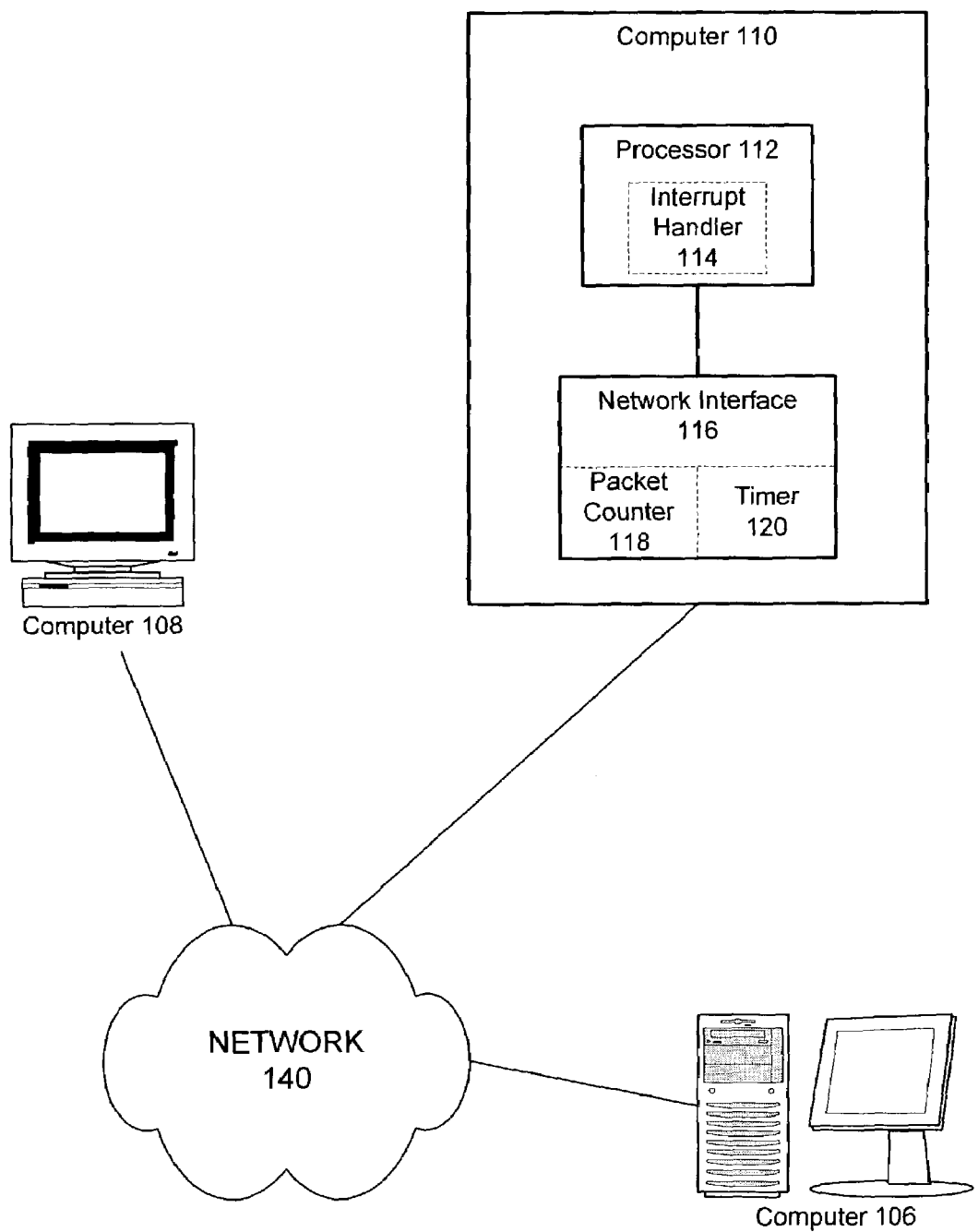
FIG. 1 is a block diagram depicting a computing environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for dynamically adjusting operating parameters of a communication interface (e.g., a network interface circuit or NIC), in response to a dynamic measure of communication traffic through the interface, to alter the frequency with which interrupts are issued by the interface to a host processor. In this embodiment, the adjustable parameters are used to determine how many communications (e.g., frames, packets) the interface may accumulate, or how long a period of time to wait after receipt of a first interrupt, before another interrupt may be issued.

The parameters that are adjusted in an embodiment of the invention may be collectively termed "interrupt coalescing parameters." In embodiments of the invention described herein, the individual parameters may be termed IMFC (Instantaneous Maximum Frame Count) for the number of communications the interface may accumulate before issuing an interrupt, and IML (Instantaneous Maximum latency) for the amount of time the interface may wait, after receiving a communication, before signaling an interrupt.

In an embodiment of the invention, an interrupt handler or device driver called by a host processor (e.g., in response to an interrupt from the communication interface) is configured to examine a workload or pattern of communications received through the interface and dynamically modify the interface parameters to suit that workload. For example, if the number of communications is consistently high, the interrupt handler may increase the interface's IMFC parameter; if the number of communications is decreasing or steadily low, the interrupt handler may decrease IMFC.

FIG. 1 depicts a computing environment in which an illustrative embodiment of the invention may be implemented. In FIG. 1, computers 106, 108, 110 are interconnected via network 140, which may comprise the Internet. Computer 110 comprises processor 112 and network interface 116. Network interface 116 includes, for purposes of an embodiment of the invention, packet counter 118 and timer 120.

Illustratively, packet counter 118 comprises a hardware register or operating parameter for storing an IMFC value computed for network interface 116 by interrupt handler 114 (when executed by processor 112). Similarly, timer 120 comprises a register or parameter for storing an IML value computed by the interrupt handler.

In an alternative embodiment of the invention, network interface 116 may be any communication interface that employs parameters that can be adjusted to affect the generation of interrupts. Another alternative embodiment may be implemented in a computer comprising multiple communication interfaces handling the same or different types of traffic. Thus, an embodiment of the invention may be implemented for wired and/or wireless communications formatted according to any communication protocol(s), such as Ethernet, TCP/IP, ATM (Asynchronous Transfer Mode), WAP (Wireless Access Protocol) and so on.

In an embodiment of the invention, an interrupt handler or device driver (e.g., interrupt handler 114 of FIG. 1) determines appropriate settings for the IMFC and/or IML parameters of a communication interface as frequently as every interrupt it services. In other embodiments, some other frequency may be applied (e.g., every other interrupt). The parameters are set according to trends it detects in traffic received from the interface and/or the status (e.g., workload) of a host processor. If multiple communication interfaces are employed in one computer system, whether they are serviced by one interrupt handler or by different handlers, the interrupt coalescing parameters of each interface may be set independently of the other(s).

To limit or restrict the range of values that can be assigned to IMFC and/or IML, one or more operating parameters may be exposed to a user for suitable configuration. For example, in one embodiment of the invention, a user may set a "maximum_packets" parameter to serve as an upper bound on IMFC. A user may also be able to set a "maximum_latency" parameter to serve as an upper bound on IML. In one implementation of this embodiment, a default value for maximum_packets is twenty-four, while a default value for maximum_latency is 13.5 microseconds.

Also, lower bounds, herein called "minimum_packets" and "minimum_latency," may be placed on IMFC and IML, respectively. Illustrative values for minimum packets and minimum_latency are 1 packet and 4.5 microseconds, respectively. In this embodiment of the invention, latency values are restricted to multiples of 4.5 microseconds. This type of restriction may be expressed as another parameter, "incremental_latency." In other embodiments (e.g., for a different type of processor or computer system), a different incremental latency may be applied, and/or a user may not be able to set a lower bound on IMFC or IML.

In one embodiment of the invention, a maximum Fallback Latency Sensitivity (maximum_FLS) parameter is exposed to a user. In this embodiment, the FLS parameter is expressed as a number of interrupts. Operation of an FLS mechanism or process, as explained in detail below, helps alleviate, or suppress, an inefficient pattern of adjustments to interrupt coalescing parameters.

Illustratively, when a communication interface is initialized, its IMFC is set to a user-supplied value for minimum_packets, and IML is set to a user-supplied value for maximum_latency. Alternatively, either or both IMFC and IML may be set to some default or intermediate values (e.g., between minimum_packets and maximum_packets, and between minimum latency and maximum_latency). During operation of a method of the invention, IMFC and IML are dynamically adjusted according to the type or pattern of traffic forwarded to the host from the communication interface.

While determining an appropriate new value for an interrupt coalescing parameter, the interrupt handler makes use of a "Trend" value or parameter as a dynamic representation of traffic received from the communication interface. More particularly, Trend indicates whether one or more recent interrupts have been issued with full complements of packets (i.e., a number of packets at least equal to IMFC). In other words, Trend indicates how the number of packets received with one or more preceding interrupts compares to the values of IMFC at the time of the interrupts. In one implementation, the value of Trend is an integer, and therefore may be negative, positive or zero.

In one embodiment of the invention, as high numbers of packets, frames, cells or other communications are received, the interrupt handler receives a full load of packets with each interrupt it services. This means that the communication interface's IMFC parameter is continually met, and may be a sign that even more packets could be forwarded with each interrupt. The value of the Trend parameter will increase, and may become more and more positive each time the interrupt handler receives a full load of packets. Conversely, each time the number of packets received with an interrupt is less than IMFC, Trend is decreased, and may become more and more negative, to indicate a negative correlation between IMFC and the number of packets being received.

If the traffic "trend" reverses polarity, Trend may be set to zero. For example, if Trend is positive, and then the interrupt handler receives less than a full set of packets (i.e., less than IMFC) with an interrupt, Trend may be set to zero. Or, if Trend is negative, and the interrupt handler receives a full set of packets, this also may cause Trend to be set to zero. Resetting Trend to zero may prepare it to change polarity to quickly reflect a change in workload (e.g., from bulk data transfer to request-response, or vice versa).

As one skilled in the art will appreciate, an interrupt handler may be able to determine the cause of an interrupt received from a communication interface by comparing the number of packets received with an interrupt to the interface's IMFC. If the number of packets is less than IMFC, then it is likely that the interrupt was signaled because the interface's IML parameter expired. Conversely, if the number of packets received is at least equal to IMFC, then it is likely that the interrupt was issued because the IMFC parameter was reached.

In one embodiment of the invention, each time an interrupt associated with a packet transfer is received, and the interrupt handler is called, the interrupt handler compares the number of packets received with the interrupt to the current IMFC setting. Then the current Trend is examined. Unless the number of received packets contradicts the trend, in which case Trend is zeroed and the interrupt handler can finish any other interrupt-related tasks (e.g., processing the packets), the current IMFC is combined with the current Trend (or some proportionate value) to produce a new IMFC value. Then, Trend may be incremented or decremented to generate a new Trend value. Finally, the IMFC parameter or register of the communication interface is updated to (e.g., overwritten by) the new IMFC value and the interrupt handler can continue its work. The interface's IML parameter may also be updated.

Between its servicing of interrupts, various operating parameters or values used by the interrupt handler or device driver to adjust an interrupt coalescing parameter (e.g., IMFC, IML, Trend, minimum_latency, maximum_packets, incremental_latency, various counters) may be stored as part of a device driver's information structure. In particular, for each communication interface, a separate set of parameters may be maintained by its driver.

Figure 2:
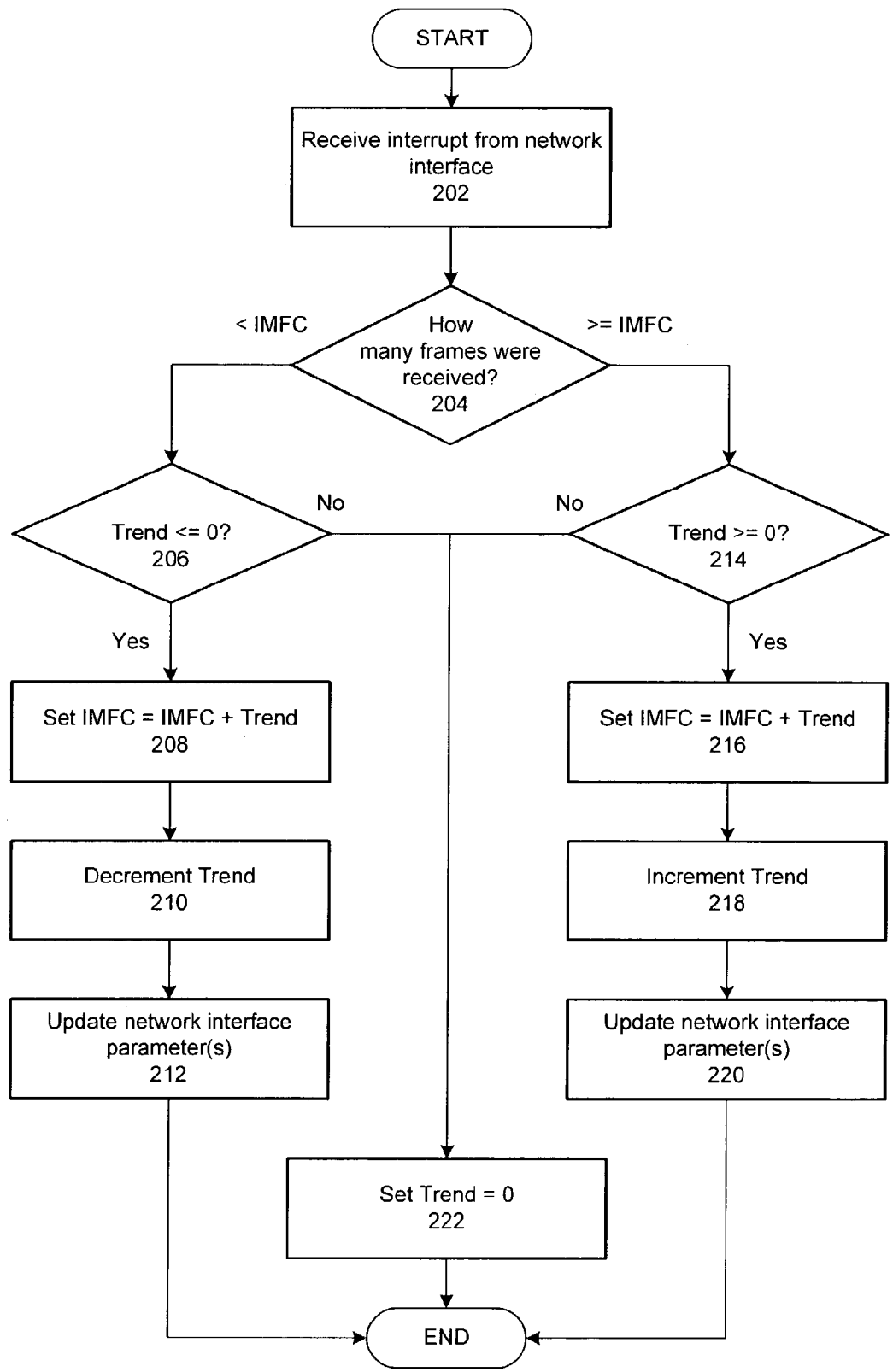
FIG. 2 is a flowchart demonstrating one method of dynamically adjusting interrupt coalescing parameters of a communication interface, according to one embodiment of the invention.

FIG. 2 is a flowchart demonstrating a method of adjusting interrupt coalescing parameters of a communication interface, according to one embodiment of the invention. The illustrated method is primarily applied by a device driver or interrupt handling routine executed by a host processor that receives interrupts when the communication interface passes one or more frames, packets or other communications to the host.

In state 202, a first interrupt is received from the communication interface, along with one or more frames. The interrupt may have been generated because the interface accumulated a number of frames equivalent to its current IMFC setting, or because a latency timer set to IML expired.

In state 204, the interrupt handler compares the number of received frames, N, to the current IMFC setting. If N≧IMFC, the method advances to state 214; otherwise (i.e., N<IMFC), the method continues at state 206.

In state 206, the number of frames received with the interrupt is less than the maximum that could have been sent. This indicates that the interrupt was issued because a latency timer (e.g., IML) expired. This may indicate that IMFC is set too high for the current flow of communication traffic. Therefore, the interrupt handler determines whether the current trend, T, is less than or equal to 0, which would indicate that at least the previous interrupt also arrived with fewer than IMFC frames. If T>0, the method advances to state 222.

Otherwise, if T≦0, in order to allow IMFC to be decreased, or decreased further, in state 208 IMFC is adjusted by the value of the trend parameter (i.e., IMFC=IMFC+T). Because T is no greater than zero, IMFC will not increase, and may instead decrease.

However, in the illustrated embodiment of the invention, the minimum value that may be assigned to IMFC is determined by the parameter minimum_packets (e.g., one). Thus, if combining IMFC and T would yield a new IMFC value less than the minimum, IMFC is set to the minimum.

In state 210, because N<IMFC, the trend value is decremented (e.g., T=T−1).

In state 212, the interrupt handler updates one or more interrupt coalescing parameters of the communication interface. In particular, the interrupt handler sets the interface's IMFC value to the newly computed IMFC. The method ends after state 212.

In state 214, the number of frames received with the interrupt is at least equal to the maximum that the communication interface could send (i.e., IMFC), which indicates that IMFC may be too low for the current traffic flow. The interrupt handler therefore determines whether T≧0, to compare the present situation is the continuation of a trend of receiving the maximum number of frames. If T<0, the illustrated method continues at state 222; otherwise, the method continues at state 216.

In state 216, IMFC is increased by the trend value (i.e., IMFC=IMFC+T), to allow the communication interface to send more frames with the next interrupt.

In state 218, T is incremented (e.g., T=T+1).

In state 220, the interrupt handler updates one or more interrupt coalescing parameters of the communication interface. In particular, the interrupt handler sets the interface's IMFC value to the newly computed IMFC. The method ends after state 220.

In state 222, the trend, T, is set to zero (i.e., T=0). Illustratively, this is done if the number of frames received by the interrupt handler contradicts the trend. Thus, if the maximum number of frames is received, yet the trend is negative, or if less than the maximum number of frames is received, but the trend is positive, the interrupt handler will set the trend to zero. The method then ends.

TABLE 1 illustrates an application of the method of FIG. 2. "INT" is an ordinal index representing a sequence of interrupts. "Old Trend" and "Old IMFC" represent the values of Trend and IMFC before the current interrupt (e.g., set during the previous interrupt). "Frames" indicates the number of frames received at the host with the current interrupt.

"New Trend" and "New IMFC" represent the new IMFC and Trend values generated by the interrupt handler. As described above, the value of New Trend depends on Old Trend and the relationship between Frames and Old IMFC. The value of New IMFC depends on Old Trend and Old IMFC. "Total Frames" is a cumulative count of the number of frames received.

TABLE 1

| INT | Old Trend | Old IMFC | Frames | New Trend | New IMFC | Total Frames |
|---|---|---|---|---|---|---|
| 0 | 0 | 1 | 1 | 1 | 1 | 1 |
| 1 | 1 | 1 | 1 | 2 | 2 | 2 |
| 2 | 2 | 2 | 2 | 3 | 4 | 4 |
| 3 | 3 | 4 | 4 | 4 | 7 | 8 |
| 4 | 4 | 7 | 7 | 5 | 11 | 15 |
| 5 | 5 | 11 | 11 | 6 | 16 | 26 |
| 6 | 6 | 16 | 16 | 7 | 22 | 42 |
| 7 | 7 | 22 | 22 | 8 | 24 | 64 |
| 8 | 8 | 24 | 8 | 0 | 24 | 72 |

TABLE 1-continued

| INT | Old Trend | Old IMFC | Frames | New Trend | New IMFC | Total Frames |
|---|---|---|---|---|---|---|
| 9 | 0 | 24 | 4 | −1 | 24 | 76 |
| 10 | −1 | 24 | 4 | −2 | 23 | 80 |
| 11 | −2 | 23 | 12 | −3 | 21 | 92 |
| 12 | −3 | 21 | 20 | −4 | 18 | 112 |
| 13 | −4 | 18 | 12 | −5 | 14 | 124 |
| 14 | −5 | 14 | 4 | −6 | 9 | 128 |

TABLE 1 illustrates how IMFC and Trend may increase when successive interrupts arrive with full complements of packets. In this example, maximum_packets (i.e., the upper bound on IMFC) is set to 24, which is reached during the processing of interrupt number 7. The Trend value then swings from positive to negative as a series of interrupts is received with packet loads that are less than IMFC. The IMFC parameter then steadily decreases as long as interrupts are received without full packet loads.

The maximum_FLS (Fallback Latency Sensitivity) parameter introduced above may be used in an embodiment of the invention to prevent a "hunting" pattern of adjustments to interrupt coalescing parameters (e.g., IMFC), in which IMFC "hunts" for an appropriate value.

In particular, when IMFC is at its minimum value, such as one, IMFC will be increased by one (e.g., to two) after a single packet or communication is received. This adjustment to IMFC prepares the communication interface to handle an influx of packets (e.g., a bulk data transfer pattern of traffic). However, if a request-response pattern is experienced instead, which may be evidenced by the receipt of only one packet during each successive interrupt, then each packet received while IMFC is at its incremented value (e.g., two) will be delayed, because its associated interrupt will be issued only when the latency timer (e.g., IML) expires. Because only one packet is received during each interrupt, the increase in IMFC causes inefficient operation of the interface.

This is a special case of the situation in which the number of packets received is less than IMFC. Processing of the packet(s) is delayed because an interrupt is not issued until a latency timer expires. In contrast, when IMFC is set to a minimum value of one and a single packet is received, an interrupt is issued right away.

Figure 3A:
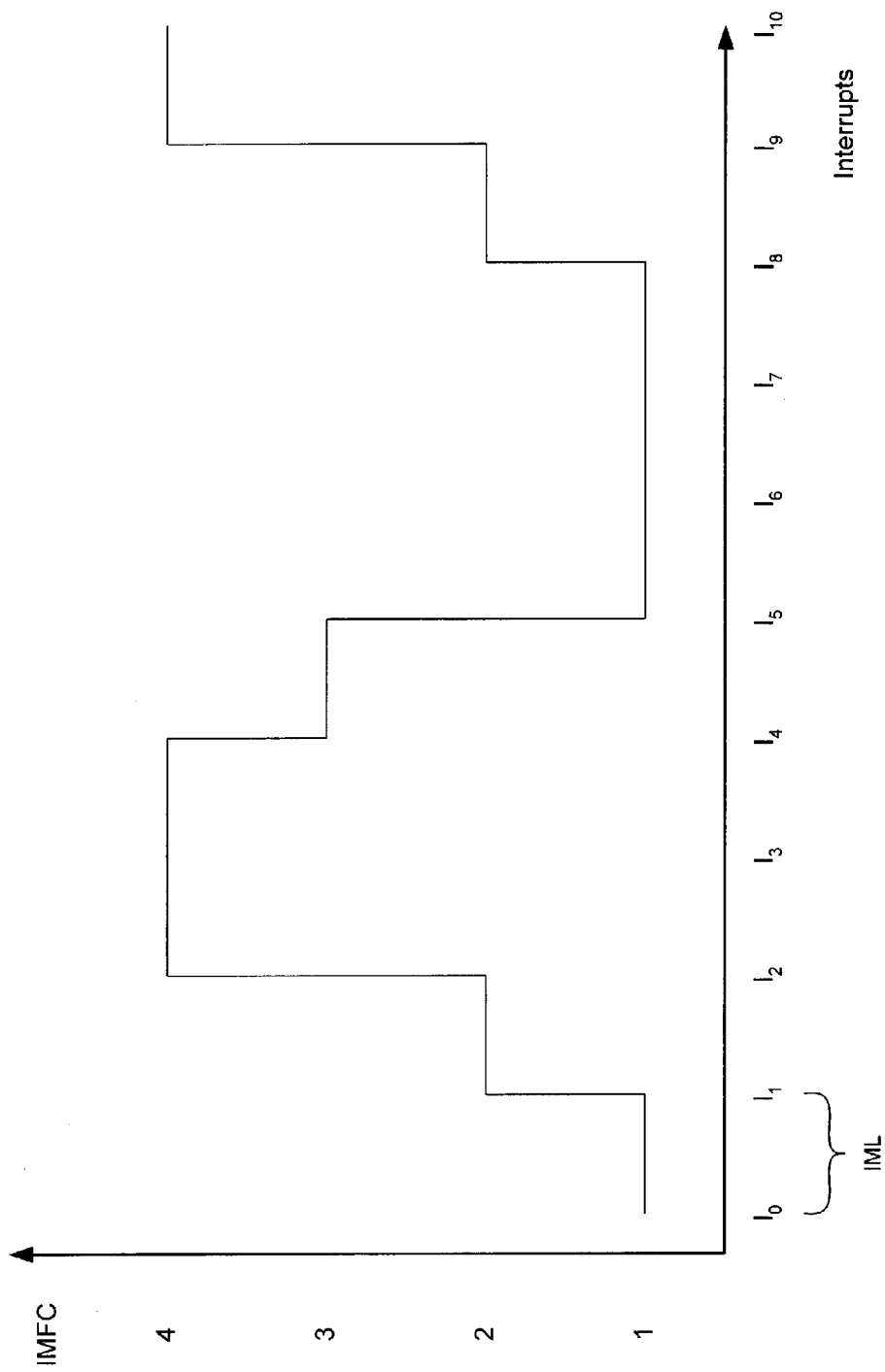
FIG. 3A is a graph demonstrating a "hunting" pattern of interrupt coalescing parameter adjustments that may be observed with one embodiment of the invention.

FIG. 3A is a graph of IMFC adjustments for successive interrupts, and exhibits an illustrative hunting pattern spanning several interrupts. TABLE 2 reflects adjustments to IMFC and Trend made during servicing of the interrupts, and the number of packets received with each interrupt.

TABLE 2

| INT | Old Trend | Old IMFC | Frames | New Trend | New IMFC | Total Frames |
|---|---|---|---|---|---|---|
| 0 | 0 | 1 | 1 | 1 | 1 | 1 |
| 1 | 1 | 1 | 1 | 2 | 2 | 2 |
| 2 | 2 | 2 | 1 | 0 | 4 | 3 |
| 3 | 0 | 4 | 1 | −1 | 4 | 4 |
| 4 | −1 | 4 | 1 | −2 | 3 | 5 |
| 5 | −2 | 3 | 1 | −3 | 1 | 6 |
| 6 | −3 | 1 | 1 | 0 | 1 | 7 |
| 7 | 0 | 1 | 1 | 1 | 1 | 8 |
| 8 | 1 | 1 | 1 | 2 | 2 | 9 |
| 9 | 2 | 2 | 1 | 0 | 4 | 10 |
| 10 | 0 | 4 | 1 | −1 | 4 | 11 |

For each interrupt depicted in FIG. 3A, the interrupt handler receives just one packet, which may indicate a request-response communication environment. At interrupt $I_0$, because the single interrupt matches the current IMFC value, Trend is incremented to record that occurrence and allow IMFC to grow, in case more than one packet could be transferred from the communication interface to the host at a time. During interrupt $I_1$, Trend is incremented again because the single received packet matched IMFC, and so the value of IMFC is increased. At interrupt $I_2$, even though Trend is now zeroed—because the number of received packets (i.e., 1) is less than IMFC—IMFC increases again due to the magnitude of Trend. IMFC levels off during $I_3$, and Trend then swings negative. This allows IMFC to fall back to its minimum value during interrupts $I_4$, $I_5$ and $I_6$. The "hunting" pattern then resumes (if the same traffic pattern continues).

In one embodiment of the invention, the maximum_FLS parameter is used to initialize an FLS counter when IMFC is increased from its minimum value. Illustratively, a suitable value for maximum_FLS is three. In this embodiment, the minimum value of IMFC is one, but in other embodiments of the invention, a different minimum value may be employed.

In one alternative embodiment of the invention, activation of the FLS mechanism requires not only an increase in IMFC from its minimum value, but also the receipt of a number of packets equal to IMFC. Thus, in this embodiment, if the number of packets received during the interrupt in which IMFC increases from its minimum value is less than (or greater than) IMFC, the FLS mechanism does not kick in.

After being initialized, the FLS counter decrements by one with each successive interrupt handled, until reaching zero, at which time the FLS mechanism becomes quiescent. Until the FLS counter reaches zero, if an interrupt is issued because the latency timer (e.g., IML) of the communication interface expired, then the Trend value is set to −1 and IMFC is set to 1. Illustratively, the interrupt handler can determine that an interrupt was received because of expiration of the latency timer if the number of packets received with the interrupt is less than IMFC.

Also, when the FLS counter is initialized, IML is set to a minimum value which, in this embodiment, is 4.5 microseconds. Each time the FLS counter is decremented, IML is increased toward its maximum (i.e., maximum_latency), by the value of incremental_latency (if such a parameter is set). If IML is restricted to multiples of 4.5 microseconds in this embodiment, it grows from 4.5 microseconds to 9.0 microseconds to 13.5 microseconds, etc. When the FLS counter reaches zero, IML is reset to its "normal" value which, in this embodiment, is equivalent to maximum_latency. Decreasing the amount of time between interrupts when the FLS counter is initialized helps promote a rapid return of IMFC to minimum_packets if a low rate of packet arrival continues.

Figure 3B:
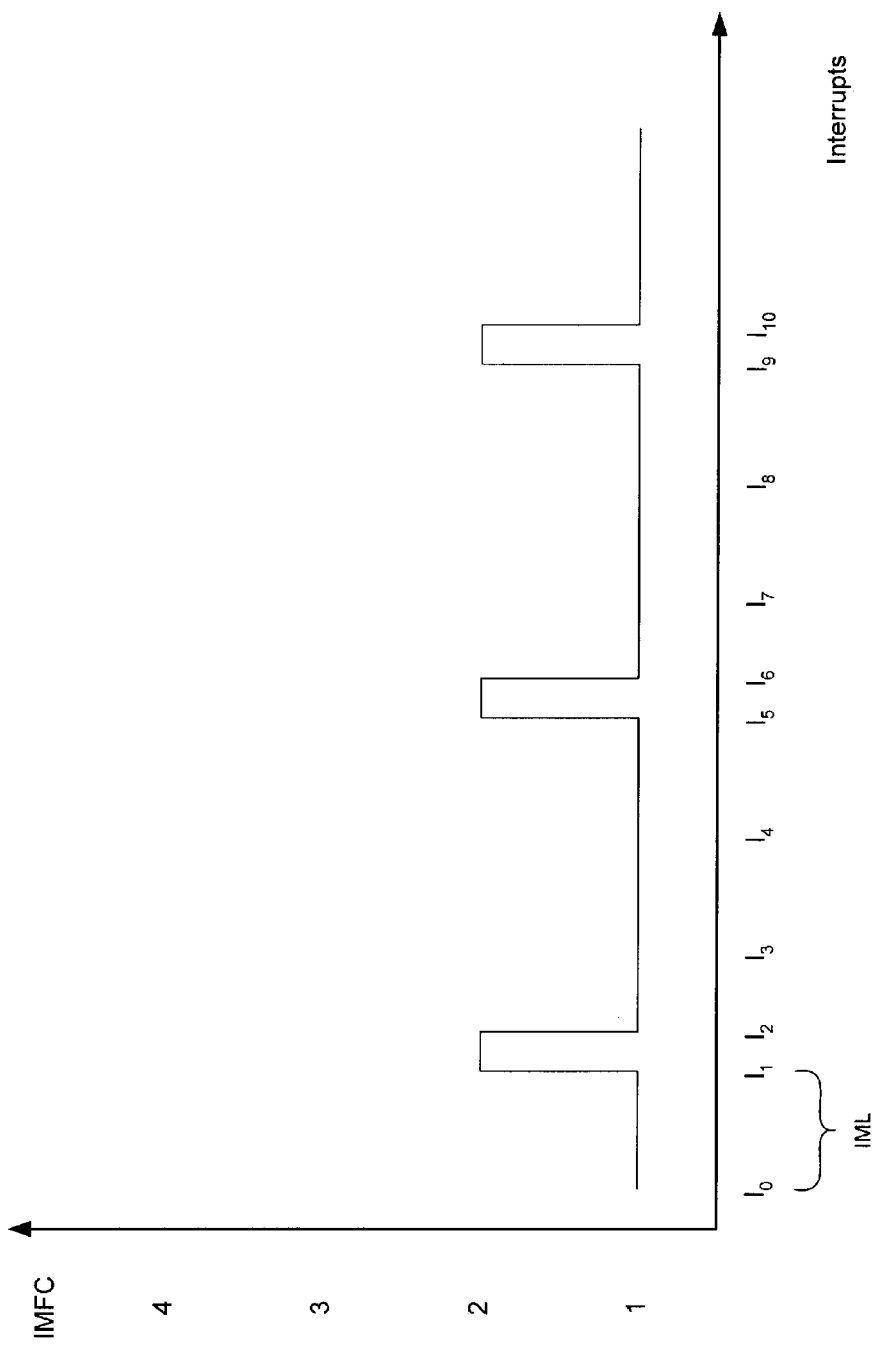
FIG. 3B is a graph demonstrating an attenuated "hunting" pattern of interrupt coalescing parameter adjustments that result from implementation of a fallback latency sensitivity (FLS) mechanism, according to one embodiment of the invention.

FIG. 3B and TABLE 3 reflect the application of an FLS mechanism in an embodiment of the invention, for the same traffic pattern reflected in FIG. 3A and TABLE 2. TABLE 3 includes additional columns showing the values of the FLS counter and IML (in microseconds). In this example, maximum_FLS=3 and, before interrupt number 0, FLS (the FLS counter)=0 and IML is equal to maximum_latency (e.g., 13.5 microseconds). Minimum_latency and incremental_latency are both 4.5 microseconds. Minimum_packets=1.

TABLE 3

| INT | Old Trend | Old IMFC | Frames | New Trend | New IMFC | New IML | New FLS | Total Frames |
|---|---|---|---|---|---|---|---|---|
| 0 | 0 | 1 | 1 | 1 | 1 | 13.5 | 0 | 1 |
| 1 | 1 | 1 | 1 | 2 | 2 | 4.5 | 3 | 2 |
| 2 | 2 | 2 | 1 | −1 | 1 | 9.0 | 2 | 3 |
| 3 | −1 | 1 | 1 | 0 | 1 | 13.5 | 1 | 4 |
| 4 | 0 | 1 | 1 | 1 | 1 | 13.5 | 0 | 5 |
| 5 | 1 | 1 | 1 | 2 | 2 | 4.5 | 3 | 6 |
| 6 | 2 | 2 | 1 | −1 | 1 | 9.0 | 2 | 7 |

In comparison to FIG. 3A, the graph of FIG. 3B shows a much more efficient treatment of request-response traffic, and a greatly attenuated hunting pattern. In particular, because IML is temporarily reduced during application of the FLS mechanism, and because IMFC is rapidly returned to its minimum value, the latency experienced by packets received at the communication interface is substantially reduced.

Figure 4A:
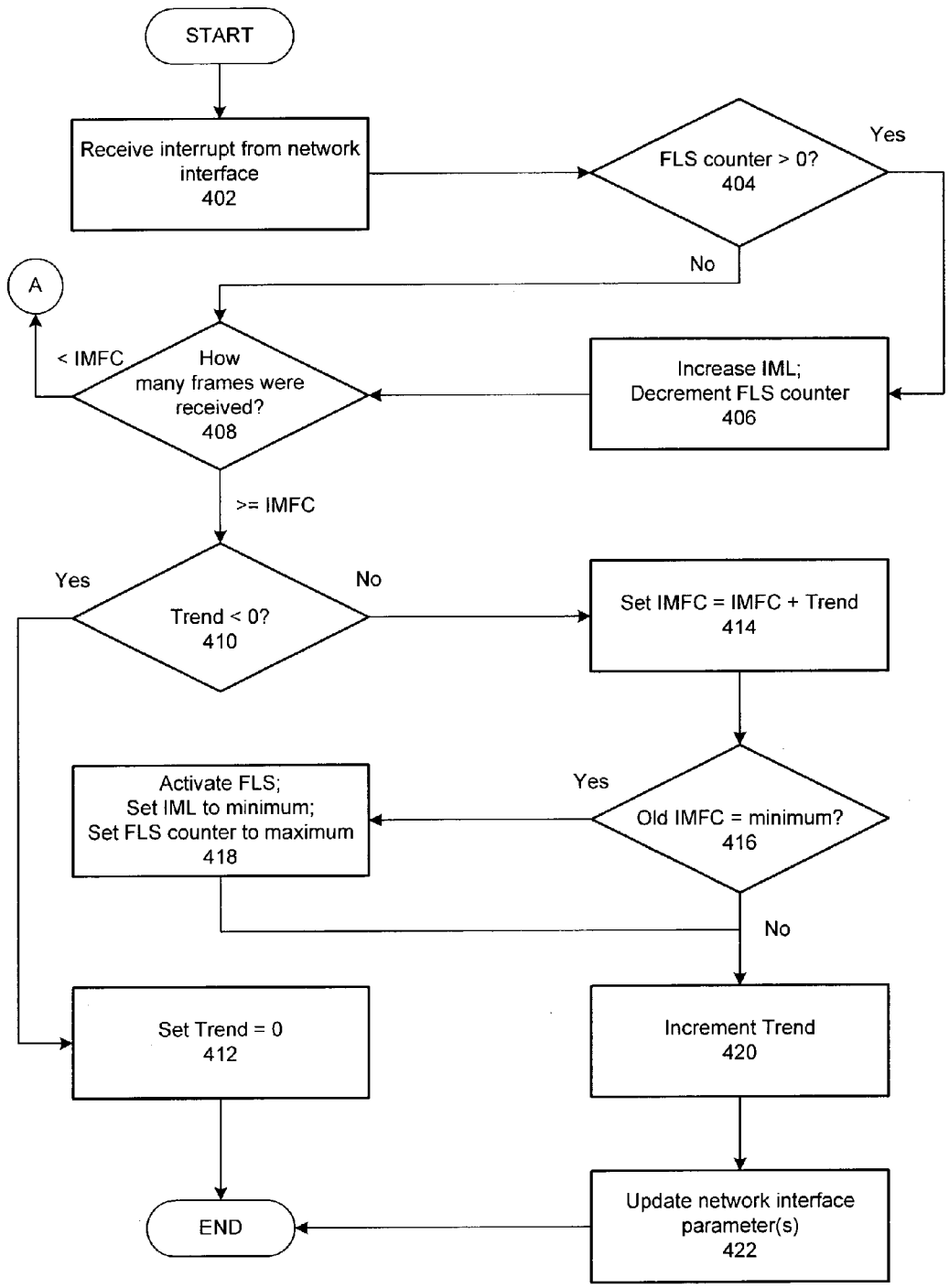
FIGS. 4A–B comprise a flowchart demonstrating a method of dynamically adjusting interrupt coalescing parameters of a communication interface while implementing an FLS mechanism, according to one embodiment of the invention.
Figure 4B:
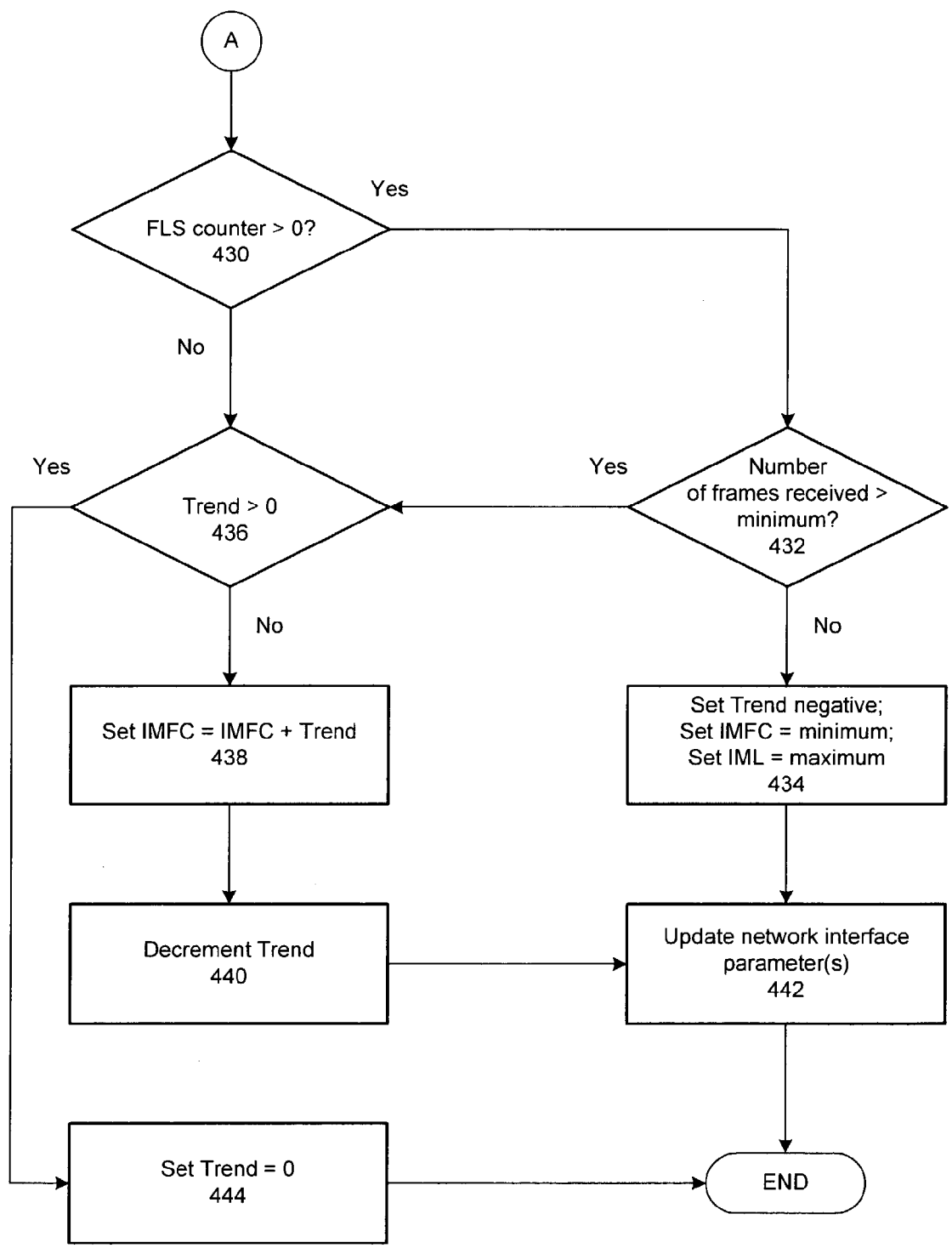

FIGS. 4A–B demonstrate, in greater detail, a method of automatically and dynamically adjusting interrupt coalescing parameters (e.g., IMFC, IML) of a communication interface, according to the dynamic workload of the interface, in one embodiment of the invention.

In state 402, the interrupt handler or device driver is called, invoked or woken to handle an interrupt from a network interface or other communication interface. The interrupt was signaled either because the network interface accumulated a number of frames, packets or other communications equal to its current IMFC setting or because a period of time equal to its current IML setting elapsed after receipt of a frame.

In state 404, the interrupt handler examines an FLS counter to determine if it is greater than 0. If it is greater than zero, then the FLS mechanism is active, and the method continues at state 406; otherwise, the method advances to state 408.

In state 406, the interrupt handler increases IML (e.g., by the value of incremental_latency), but not beyond the value of maximum_latency. The interrupt handler also decrements the FLS counter by one, but no lower than zero in this embodiment.

In state 408, the interrupt handler compares the current IMFC setting of the network interface to the number of frames received with the interrupt. If the number of frames is less than the current IMFC, the illustrated method advances to state 430.

Otherwise, in state 410, the current interrupt was issued because the network interface accumulated a number of frames at least equal to IMFC. The interrupt handler examines the current Trend value. If Trend is zero or positive, which indicates that the amount of frames received with the current interrupt (i.e., >=IMFC) matches the recent trend, the method advances to state 414.

If Trend is negative, indicating that the network interface has not been sending a full complement of frames (i.e., equivalent to IMFC) with recent interrupts, in state 412 Trend is reset to zero and the method ends.

In state 414, a new IMFC value is calculated by adding the current IMFC value and the value of Trend. However, IMFC will not be increased beyond the parameter maximum_packets.

In state 416, the interrupt handler determines whether IMFC has just been increased from minimum_packets (e.g., one). If so, the method continues at state 418; otherwise, it proceeds to state 420. In other embodiments, the interrupt handler may test for other conditions. For example, in one alternative embodiment, the interrupt handler specifically determines whether IMFC has just been increased from one to two.

In state 418, an FLS mechanism or scheme is activated. Therefore, IML is set to a minimum value (e.g., minimum_latency), such as 4.5 microseconds, and an FLS counter is initialized to maximum_FLS (e.g., three).

In state 420, the value of Trend is incremented (e.g., by one).

In state 422, one or more interrupt coalescing parameter values (e.g., the new IMFC and IML values) are written into the network interface to adjust the circumstances under which the interface will issue an interrupt, in an attempt to better match the interrupts to the actual traffic pattern and prevent or suppress an inefficient hunting pattern. The method then ends.

In state 430, the number of frames received with the current interrupt is less than the current IMFC value. The interrupt handler examines the FLS counter to see if the FLS mechanism is still active (e.g., is FLS>0?). If the FLS mechanism is no longer active, the illustrated method advances to state 436.

Otherwise, in state 432, the interrupt handler determines whether more than a minimum number of frames (e.g., one) were received with the current interrupt. If so, the method advances to state 436.

In state 434, the conditions for IMFC fall back have been satisfied. In particular, for this embodiment of the invention, the FLS counter is greater than zero, and the minimum number of frames was just received. Therefore, the interrupt handler sets Trend to a negative value (e.g., −1), resets IMFC to its minimum (e.g., minimum_packets) and sets IML to its maximum (e.g., maximum_latency). The illustrated method then advances to state 442.

In state 436, the interrupt handler determines whether the current Trend is positive. If so, then the current complement of frames (i.e., <IMFC) conflicts with the trend and therefore Trend is reset to zero in state 444 and the method ends.

Otherwise, in state 438, a new IMFC value is computed as the sum of the current IMFC value and Trend. However, IMFC will not be decreased below minimum_packets.

In state 440, the value of Trend is decremented (e.g., by one).

In state 442, the network interface is dynamically updated with one or more new interrupt coalescing parameter values (e.g., IMFC, IML). The method then ends.

In one embodiment of the invention, an interrupt coalescing parameter may be dynamically adjusted based on the workload of a host processor in addition to, or instead of, the workload of a communication interface. In this embodiment, the proportion of time the processor is idle is monitored. As the processor's idle time—or percentage of time spent idle—increases, a parameter may be adjusted to reduce the interrupt-processing burden of the processor. This embodiment of the invention is suitable for multi-processor as well as single processor computer systems.

In an implementation of this embodiment, when an interrupt from a communication interface is processed, the device driver or interrupt handler accesses performance status data regarding the processor. From the data, the proportion of the processor's time it has been idle can be determined. Its idle time may be retrieved during every interrupt or with some other frequency (e.g., every second or third interrupt).

In this implementation, the interface's IML value is adjusted upward when the processor idle time percentage reaches or falls below a threshold. Multiple thresholds may be defined, so that IML may be increased multiple times as the idle time percentage continues to fall. Similarly, IML may be decreased as the percentage of time the processor is idle rises. By increasing IML as the processor becomes busier, fewer interrupts may be sent to the processor, thereby helping to reduce its burden. In other implementations of this embodiment, other operating and/or interrupt coalescing parameters may be adjusted as the processor's workload increases (e.g., IMFC, maximum_FLS, incremental_latency).

In addition to reducing the number of interrupts issued over time, another possible benefit of increasing the IML setting is to increase the number of packets or other communications received and processed during each interrupt.

The idle time percentage threshold(s) and corresponding latency value(s) of a communication interface may be stored as operating parameters, and may be tunable by a user. For example, one or more "idle_thresholdX" and "idle_latencyX" values may be maintained, wherein X may be an integer. TABLE 4 lists idle_threshold and idle_latency values that may be employed in an implementation of this embodiment of the invention. The processor's proportion of time spent idle may be represented as Idle %.

TABLE 4

| X | idle_thresholdX | idle_latencyX |
|---|---|---|
| 1 | 50 | 30 |
| 2 | 40 | 180 |
| 3 | 30 | 360 |
| 4 | 20 | 640 |
| 5 | 10 | 1280 |

In the implementation reflected in TABLE 4, the normal minimum_latency and maximum_latency operating parameters may be used to determine IML as long as the processor spends more than half (i.e., 50%) of its time idle. However, when Idle % falls below 50% (or other initial threshold), IML will be adjusted accordingly. The indicated idle_latency values may be expressed as multiples to be applied to a basic or incremental latency. Thus, for idle_latency2, the value 180 may be interpreted to mean 180 times the shortest latency period (e.g., 4.5 microseconds). Alternatively, an idle_latency value may be interpreted as a number of microseconds, or other units, of latency to be applied.

Illustratively, the lowest idle_thresholdX that is greater than or equal to Idle % will be applied. Thus, if Idle %=21%, idle_threshold3 is indicated and idle_latency3 may be applied.

In this implementation, the indicated latency (i.e., idle_latencyX) may be used to overwrite any of the operating parameters (e.g., minimum_latency, maximum_latency), or may be assigned directly to IML as long as Idle % is below the applicable threshold.

In another embodiment of the invention, processor "busy" time—rather than idle time—may be monitored. For example, the processor workload could be interpreted as being proportional to the time spent on system tasks (e.g., "kernel time," "system time") or other types of tasks that may be considered relatively high in priority. In this embodiment, IML may be increased when the processor workload rises above a certain threshold (e.g., 50%). And, IML could be increased if/as the workload continues to rise.

Figure 5:
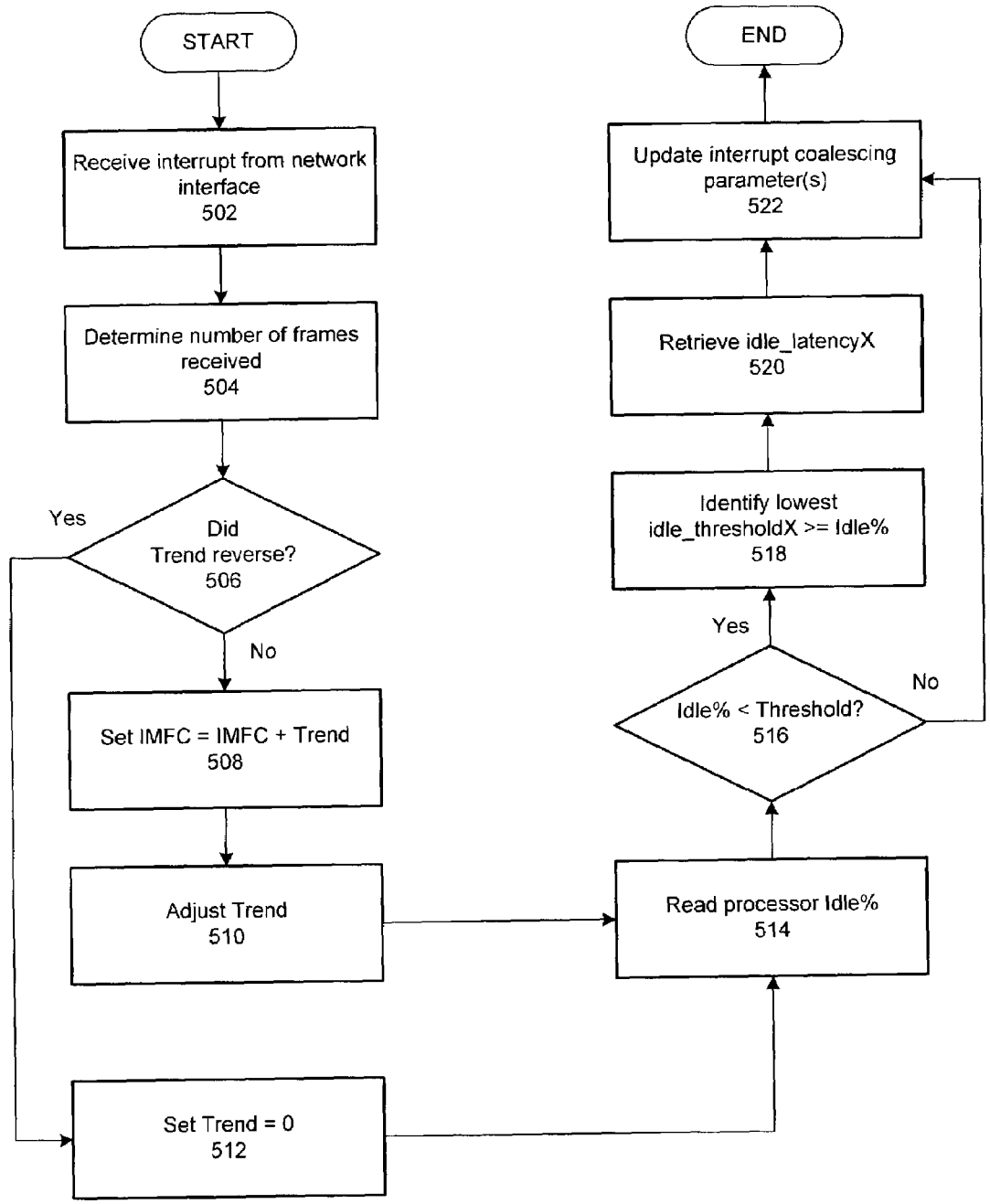
FIG. 5 is a flowchart demonstrating a method of dynamically adjusting an interrupt coalescing parameter of a communication interface in accordance with the workload of a host processor configured to receive interrupts from the communication interface.

FIG. 5 demonstrates a method of adjusting an interrupt coalescing parameter (e.g., IML) according to a processor's workload, according to one embodiment of the invention. The illustrated method may be readily modified or adapted for use with the FLS mechanism as described above in conjunction with FIGS. 4A–B.

In state 502, a first interrupt is received from the communication interface, along with one or more frames. The interrupt may have been generated because the interface accumulated a number of frames equivalent to its current IMFC setting, or because a latency timer set to IML expired. In response to the interrupt, an interrupt handler or device driver for the communication interface is invoked.

In state 504, the interrupt handler determines the number of frames, N, that were received with the interrupt.

In state 506, the relation between N and IMFC is determined, and is compared with the current Trend. If T<0 and N≧IMFC, or T>0 and N<IMFC, then the number of received packets is not consistent with Trend, and the method advances to state 512.

Otherwise, in state 508, the number of received packets is consistent with Trend, and so IMFC is adjusted accordingly (i.e., IMFC=IMFC+T). In state 510, Trend is adjusted (e.g., incremented or decremented), depending on whether it is increasing or decreasing. After state 510, the illustrated method continues at state 514.

In state 512, Trend is set to zero to indicate a reverse. Either a full set of packets was received when fewer were expected, or less than a full set was received when a full set was expected.

In state 514, the interrupt handler or device driver accesses a data structure storing performance status data for the processor on which the handler or driver is executing. In particular, the percentage of processor time that is spent idle (i.e., Idle %) is read or calculated from the available data.

In state 516, Idle % is compared to the first, highest or only idle threshold, depending on the configuration of the interface. If the processor's idle time is high enough (e.g., >50%), then there is no need to modify the normal method of calculating or setting IML, and so the method advances to state 522.

Otherwise, in state 518, the lowest idle_threshold value that is greater than Idle % is identified.

In state 520, the idle_latency value corresponding to the idle_threshold value is retrieved.

In state 522, one or more interrupt coalescing parameters may be updated as necessary. Thus, if Idle % fell to a value less than an idle_threshold, a new, higher IML value may be applied. Illustratively, the applicable idle_latency may be copied directly to IML.

Conversely, if Idle % has increased such that it is now greater than any idle_threshold value(s), IML may be reset to maximum_latency or minimum_latency.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of dynamically adjusting one or more interrupt coalescing parameters on a communication interface according to a status of a host processor configured to receive interrupts from the communication interface, without reinitializing the communication interface, the method comprising:
   receiving at a host processor a first interrupt from the communication interface;
   identifying a first number of communications received with the first interrupt;
   determining a workload of the host processor;
   comparing the first number of communications to a current value of a first parameter of the communication interface, wherein said first parameter comprises a number of communications the communication interface may accumulate before issuing an interrupt to the host processor;
   examining a trend configured to indicate a relationship between:
      a previous value of the first parameter at the time of a previous interrupt; and
      a previous number of communications received with the previous interrupt;
   adjusting said trend based on:
      said comparison of said first number of communications to said current value of said first parameter; and
      a current value of said trend;
   if said adjusted trend is not equal to a threshold trend;
      producing a first new value for said first parameter, based on said current value of said first parameter and said trend; and
      dynamically updating said first parameter of the communication interface with said first new value; and
   if said workload is greater than a first threshold, increasing a second parameter of the communication interface, wherein said second parameter indicates a maximum period of time the communication interface may wait after receiving a communication before generating an interrupt to the host processor.

2. The method of claim 1, wherein adjusting said trend comprises setting said trend to said threshold trend.

3. The method of claim 1, wherein adjusting said trend comprises incrementing said trend.

4. The method of claim 1, wherein adjusting said trend comprises decrementing said trend.

5. The method of claim 1, wherein said threshold trend is zero.

6. The method of claim 1, wherein said producing a first new value for said first parameter comprises:
   adding said current value of said first parameter and said current value of said trend.

7. The method of claim 1, wherein said dynamically updating said first parameter comprises:
   writing said first new value of said first parameter to the communication interface.

8. The method of claim 1, further comprising:
   examining a fallback counter comprising a number of interrupts during the processing of which said first new value of said first parameter may be automatically set to a first minimum value;
   if said fallback counter is not equal to a final fallback counter value:
      adjusting said fallback counter toward said final fallback counter value; and
      selecting a second new value for said second parameter of the communication interface; and
   if said adjusted trend is not equal to said threshold trend, dynamically updating said second parameter of the communication interface with said second new value.

9. The method of claim 8, wherein said first minimum value is 1.

10. The method of claim 8, wherein said final fallback counter value is 0.

11. The method of claim 8, wherein said adjusting said fallback counter comprises decrementing said fallback counter.

12. The method of claim 8, further comprising:
if said first number of communications is not less than said current value of said first parameter and said trend is not negative:
if said current value of said first parameter is equal to said first minimum value:
setting said second new value of said second parameter to a second minimum value; and
setting said fallback counter to an initial fallback counter value.

13. The method of claim 12, wherein said second minimum value equals a value by which said second parameter is incrementable.

14. The method of claim 12, wherein said second minimum value is 4.5 microseconds.

15. The method of claim 12, wherein said initial fallback counter is approximately 3.

16. The method of claim 8, further comprising:
if said first number of communications is less than said current value of said first parameter and said fallback counter is not equal to said final fallback counter value:
if said first number of communications equals a minimum number of communications:
reversing said trend;
setting said first new value of said first parameter to said first minimum value; and
setting said second new value of said second parameter to a maximum value.

17. The method of claim 16, wherein said reversing said trend comprises setting said trend to a negative value.

18. A computer readable storage medium storing instructions that, when executed by a computer, cause the computer to perform a method of dynamically adjusting one or more interrupt coalescing parameters on a communication interface according to a status of a host processor configured to receive interrupts from the communication interface, without reinitializing the communication interface, the method comprising:
receiving at a host processor a first interrupt from the communication interface;
identifying a first number of communications received with the first interrupt;
determining a workload of the host processor;
comparing the first number of communications to a current value of a first parameter of the communication interface, wherein said first parameter comprises a number of communications the communication interface may accumulate before issuing an interrupt to the host processor;
examining a trend configured to indicate a relationship between:
a previous value of the first parameter at the time of a previous interrupt; and
a previous number of communications received with the previous interrupt;
adjusting said trend based on:
said comparison of said first number of communications to said current value of said first parameter; and
a current value of said trend;
if said adjusted trend is not equal to a threshold trend:
producing a first new value for said first parameter, based on said current value of said first parameter and said trend; and
dynamically updating said first parameter of the communication interface with said first new value; and
if said workload is greater than a first threshold, increasing a second parameter of the communication interface, wherein said second parameter indicates a maximum period of time the communication interface may wait after receiving a communication before generating an interrupt to the host processor.

19. A method of dynamically adjusting a network interface parameter for coalescing interrupts, the method comprising:
receiving a first interrupt from a network interface;
determining a number of frames, F, received in conjunction with said first interrupt;
comparing said number of frames to a dynamic threshold, DF;
identifying a trend, T, comprising an integer representing a relationship between a number of frames received in conjunction with one or more interrupts previous to the first interrupt and the value of said dynamic threshold at the times of said one or more previous interrupts;
identifying a measure of idle time, I, of a host processor configured to receive said first interrupt and said one or more previous interrupts;
comparing said measure of idle time to a dynamic idle time threshold, DI;
if F>=DF:
if T<0, setting T=0; and
if T>=0:
setting DF=DF+T;
incrementing T; and
dynamically updating one or more parameters, on the network interface, that affect when the network interface may issue an interrupt to the host processor; and
if F<DF:
if T>0, setting T=0; and
if T<=0:
setting DF=DF+T;
decrementing T; and
dynamically updating one or more parameters, on the network interface, that affect when the network interface may issue an interrupt to the host processor; and
if F>DF:
if T<0, setting T=0; and
if T>=0:
setting DF=DF+T;
decrementing T; and
dynamically updating one or more parameters, on the network interface, that affect when the network interface may issue an interrupt to the host processor; and
if I<DI, dynamically updating one or more parameters, on the network interface, that affect when the network interface may issue an interrupt to the host processor.

20. The method of claim 19, wherein said one or more parameters comprise:
a first parameter configured to indicate a number of frames the network interface may accumulate before issuing an interrupt.

21. The method of claim 20, wherein said updating one or more parameters comprises setting said first parameter to DF.

22. The method of claim 19, wherein said one or more parameters comprise:

a first parameter configured to indicate a period of time the network interface may wait, after receiving a first frame, before issuing an interrupt.

23. A computer readable storage medium storing instructions that, when executed by a computer, cause the computer to perform a method of dynamically adjusting a network interface parameter for coalescing interrupts, the method comprising:

receiving a first interrupt from a network interface;
determining a number of frames, F, received in conjunction with said first interrupt;
comparing said number of frames to a dynamic threshold, DF;
identifying a trend, T, comprising an integer representing a relationship between a number of frames received in conjunction with one or more interrupts previous to the first interrupt and the value of said dynamic threshold at the times of said one or more previous interrupts;
identifying a measure of idle time, I, of a host processor configured to receive said first interrupt and said one or more previous interrupts;
comparing said measure of idle time to a dynamic idle time threshold, DI;
if F>=DF:
  if T<0, setting T=0; and
  if T>=0:
    setting DF=DF+T;
    incrementing T; and
    dynamically updating one or more parameters, on the network interface, that affect when the network interface may issue an interrupt to the host processor; and
if F<DF:
  if T>0, setting T=0; and
  if T<=0:
    setting DF=DF+T;
    decrementing T; and
    dynamically updating one or more parameters, on the network interface, that affect when the network interface may issue an interrupt to the host processor; and
if I<DI, dynamically updating one or more parameters, on the network interface, that affect when the network interface may issue an interrupt to the host processor.

24. A method of dynamically adjusting one or more network interface parameters for coalescing interrupts, the method comprising:

receiving a first interrupt from a network interface;
if a counter>0, wherein said counter is a fallback counter:
  decrementing said counter; and
  increasing a latency, L;
determining a number of network frames, F, received in conjunction with said first interrupt;
comparing said number of network frames to a dynamic threshold, DF;
determining a trend, T, comprising an integer representing a relationship between a number of frames received in conjunction with one or more interrupts previous to the first interrupt and the value of said dynamic threshold at the times of said one or more previous interrupts;
identifying a measure of idle time, I, of a host processor configured to receive said first interrupt and said one or more previous interrupts;
comparing said measure of idle time to a dynamic idle time threshold, DI;
if F>=DF:
  if T>0, setting T=0; and
  if T<=0:
    if DF=a minimum dynamic threshold:
      setting said counter to an initial value; and
      setting L=a minimum latency;
    setting DF=DF+T;
    incrementing T; and
    updating one or more parameters, on the network interface, that affect when the network interface may issue an interrupt;
if F<DF:
  if (said counter>0) & (F=a minimum number of frames):
    setting DF=said minimum dynamic threshold;
    setting L to a maximum latency; and
    setting T=a negative value;
  32 if (said counter<=0) & (T<=0), setting T=0; and
  if [(said counter<=0) & (T<0)] OR [(said counter>0) & (F>said minimum number of frames)]:
    setting DF=DF+T;
    decrementing T; and
    updating one or more parameters, on the network interface, that affect when the network interface may issue an interrupt; and
if I<DI, dynamically updating one or more parameters, on the network interface, that affect when the network interface may issue an interrupt to the host processor.

25. The method of claim 24, wherein said one or more parameters comprise:

a first parameter configured to indicate a number of frames the network interface may accumulate before issuing an interrupt.

26. The method of claim 25, wherein said updating one or more parameters comprises setting said first parameter to DF.

27. The method of claim 24, wherein said one or more parameters comprise:

a first parameter configured to indicate a period of time the network interface may wait, after receipt of a first frame, before issuing an interrupt.

28. The method of claim 27, wherein said updating one or more parameters comprises setting said first parameter to L.

29. A computer readable storage medium storing instructions that, when executed by a computer, cause the computer to perform a method of dynamically adjusting one or more network interface parameters for coalescing interrupts, the method comprising:

receiving a first interrupt from a network interface;
if a counter>0, wherein said counter is a fallback counter:
  decrementing said counter; and
  increasing a latency, L;
determining a number of network frames, F, received in conjunction with said first interrupt;
comparing said number of network frames to a dynamic threshold, DF;
determining a trend, T, comprising an integer representing a relationship between a number of frames received in conjunction with one or more interrupts previous to the first interrupt and the value of said dynamic threshold at the times of said one or more previous interrupts;
identifying a measure of idle time, I, of a host processor configured to receive said first interrupt and said one or more previous interrupts;
comparing said measure of idle time to a dynamic idle time threshold, DI;

```
if F>=DF:
    if T<0, setting T=0; and
    if T>=0:
        if DF=a minimum dynamic threshold:
            setting said counter to an initial value; and
            setting L=a minimum latency;
        setting DF=DF+T;
        incrementing T; and
        updating one or more parameters, on the network
            interface, that affect when the network interface
            may issue an interrupt;
if F<DF:
    if (said counter>0) & (F=a minimum number of
            frames):
        setting DF=said minimum dynamic threshold;
        setting L to a maximum latency; and
        setting T=a negative value;
    if (said counter<=0) & (T<=0), setting T=0; and
    if:
        setting DF=DF+T;
        decrementing T; and
        updating one or more parameters, on the network
            interface, that affect when the network interface
            may issue an interrupt; and
```
if I<DI, dynamically updating one or more parameters, on the network interface, that affect when the network interface may issue an interrupt to the host processor.

30. An apparatus for dynamically adjusting one or more parameters of a communication interface configured to control interrupt coalescing behavior of the communication interface, comprising:
a processor;
an interrupt handler routine executable by the processor in response to an interrupt from a communication interface;
a first parameter configured to indicate a number of communications the communication interface may accumulate before signaling an interrupt to the processor;
a second parameter configured to indicate a period of time the communication interface may wait before signaling an interrupt to the processor; and
a trend value configured to indicate a correlation between a number of communications previously received from the communication interface and said first parameter when the number of communications was received;
wherein the interrupt handler routine is configured to dynamically update one or more of said first parameter and said second parameter based on a workload of the processor.

31. The apparatus of claim 30, wherein the interrupt handler routine is further configured to determine said processor workload.

32. The apparatus of claim 30, wherein said processor workload comprises an indication of a proportion of time the processor has been idle.

33. The apparatus of claim 30, wherein the interrupt handler routine is further configured to dynamically update one or more of said first parameter and said second parameter accordingly, based on a pattern of communications received at the processor from the communication interface.

34. The apparatus of claim 30, wherein said trend value is configured to become positive when a plurality of sequential interrupts received at the processor from the communication interface are received with numbers of communications at least equivalent to values of said first parameter at the times said sequential interrupts are received.

35. The apparatus of claim 34, wherein said trend value is configured to become negative when a plurality of sequential interrupts received at the processor from the communication interface are received with numbers of communications less than values of said first parameter at the times said sequential interrupts are received.

36. The apparatus of claim 35, wherein said trend value is configured to be reset to a threshold trend value when one of:
said trend value is positive and a first interrupt is received from the communication interface with a first number of communications less than said first parameter; and
said trend value is negative and a second interrupt is received from the communication interface with a second number of communications greater than or equal to said first parameter.

37. The apparatus of claim 30, wherein said first parameter is configured to increase after said trend value increases and decrease after said trend value decreases.

38. A computer system for controlling the issuance of interrupts associated with the receipt of communications, the computer system comprising:
a communication interface configured to receive communications from a communication link;
an interrupt handler configured to handle interrupts generated in response to receipt of said communications at the communication interface; and
a processor configured to execute said interrupt handler;
wherein said interrupt handler is configured to control the issuance of said interrupts by:
maintaining a latency parameter indicating a length of time the communication interface may wait, after receiving one or more communications, before issuing a corresponding interrupt; and
maintaining a first parameter indicating a number of communications the communication interface may receive before issuing a corresponding interrupt; and
wherein said interrupt handler periodically:
dynamically adjusts said latency parameter in accordance with a workload of said processor; and
dynamically adjusts said first parameter in accordance with a trend configured to indicate, for one or more interrupts, a relation between:
a value of the first parameter at the time of the interrupt; and
a number of communications received before the interrupt was issued.

39. The computer system of claim 38, wherein said interrupt hander adjusts said latency parameter by setting said latency parameter in proportion to said workload.

40. The computer system of claim 38, wherein said interrupt hander adjusts said latency parameter by:
determining a proportion of time said processor has been idle; and
if said proportion is less than a threshold, setting said latency parameter to a latency value associated with said threshold.

* * * * *

UNITED STATES PATENT AND TRADEMARK OFFICE
CERTIFICATE OF CORRECTION

PATENT NO. : 6,988,156 B2  Page 1 of 1
DATED : January 17, 2006
INVENTOR(S) : Gian-Paolo D. Musumeci It is certified that error appears in the above-identified patent and that said Letters Patent is hereby corrected as shown below:

Column 16,
Delete lines 47-55,
"if F>DF:
   if T<0, setting T=0; and
   if T>=0:
      setting DF=DF+T;
      decrementing T; and
      dynamically updating one or more parameters, on
         the network interface, that affect when the net-
         work interface may issue an interrupt to the host
         processor; and".

Column 18,
Line 2, replace "T>0" with -- T<0 --.
Line 3, replace "T<=0" with -- T>=0 --.
Line 18, delete "32".
Line 19, replace "T<0" with "T>0".

Column 19,
Line 19, replace "if:" with
-- if [(said counter<=0) & (T>0)] OR [(said counter>0) & (F>said minimum number of frames)]: --.

Signed and Sealed this

Twenty-fifth Day of April, 2006

JON W. DUDAS
*Director of the United States Patent and Trademark Office*